United States Patent Office 3,697,233
Patented Oct. 10, 1972

3,697,233
CLARIFYING AMMONIUM PHOSPHATE SOLUTIONS USING ATTAPULGITE AND BENTONITE
Alvin W. Peck, Bartlesville, Okla., assignor to Phillips Petroleum Company
No Drawing. Filed Sept. 29, 1969, Ser. No. 862,048
Int. Cl. B01d 21/01; C01b 25/28
U.S. Cl. 23—293 R                                    2 Claims

ABSTRACT OF THE DISCLOSURE

A method of clarifying phosphate solutions, containing extraneous suspended matter introduced with the phosphoric acid employed in their manufacture, by the use of clay.

---

This invention relates to the production of ammonium phosphate solutions.

In one of its more specific aspects, this invention relates to the treatment of ammonium phosphate solutions produced by the use of wet process phosphoric acid.

The production of phosphate solutions is well known. Solutions of a wide range of concentrations of phosphate and other components are particularly suitable as fertilizers. Generally, the process of producing the phosphate solution employs "wet process" phosphoric acid, an acid containing relatively large amounts of dissolved and suspended extraneous matter.

When this acid is employed in the manufacture of such solutions, and, in particular, aqueous ammonium phosphate solution, some of this extraneous matter takes the form of gelatinous precipitates which are difficult to separate from the phosphate solution. As a result, ammonium phosphate solutions produced by use of wet process acid are not readily merchantable because of discoloration and contamination caused by this extraneous matter. Hence, there is need for a method of improving the quality and clarity of the ammonium phosphate solutions produced when employing the wet process acid. The method of this invention is directed to the solution of this problem.

According to the method of this invention there is provided a process for clarifying phosphate solutions containing extraneous suspended matter introduced into the phosphate solution from the wet process phosphoric acid employed in the production of the phosphate solution which comprises introducing a clay into the solution and allowing the clay to gravitate downward through the solution while maintaining the solution in a quiescent state to produce a clarified supernatant phosphate solution and a bottoms product, and recovering the clarified phosphate solution.

In one of its embodiments the phosphate solution is an ammonium phosphate solution.

Accordingly, it is an object of this invention to provide a process for improving ammonium phosphate solutions.

It is another object of this invention to increase the proportion of salable ammonium phosphate solutions produced with wet process phosphoric acid.

The method of this invention contemplates the use of a sedimentation medium, its introduction into the acid solution being made in either a batchwise or in a continuous manner, as for example, while the solution is being pumped to storage. It further contemplates the settlement of this medium from the solution during quiescence in such a manner, and for such a time, as to carry from the acid solution the principal portion of such extraneous matter so as to produce a substantially clear supernatant liquid.

The method of this invention contemplates the use of such coagulating mediums as act as falling fluid filters upon settling, including such materials as attapulgite clay, bentonite clay, and mixtures thereof, which produce sedimentation. Such materials are generally commercially available and have the following properties which are suitable:

Particle size 0.12—1.0 microns
Surface area, m.$^2$/g. 100–200

The invention contemplates the addition of such solids or clays to the solution continuously as the solution is introduced into storage or to the solution in storage. Any number of individual clay contactings can be employed.

Generally, the clay will be added at the rate of about 0.125 to about 0.25 weight percent of the solution, at ambient temperature, the clay being distributed over the surface of the solution so as to insure maximum contact with the suspended matter in the solution. Premixing of the clay and the liquid, if employed, is preferably done with high shear mixing equipment in order to effect complete wetting and dispersal of the clays.

The settling time to which the solution is subject will be sufficient to provide the desired separation. The length of time will depend upon the volume of solution, the configuration of the settling basin or container, the degree of clarity which is desired and the density of the solution and clay.

At any period during the settling of the solids under suitable conditions of quiescence and residence time, or upon completion of the settling, the clear supernatant liquid is recovered from the bottoms product in any conventional manner. Both the supernatant liquid and the bottom product are recovered as merchantable products of the process.

The invention can be modified to include addition of flocculating agents, filtration of the supernatant liquid, and other techniques.

It will be evident that various modifications can be made to the method of this invention in light of the above disclosure. However, such are considered as being within the skill of the art.

What is claimed is:

1. A method of clarifying ammonium phosphate solutions derived from wet process phosphoric acid containing suspended matter comprising a gelatinous precipitate which consists of introducing a clay selected from the group consisting of attapulgite and bentonite into the solution in an amount of about 0.125 to about 0.25 weight percent of the solution, allowing the clay to settle from the solution while maintaining the solution in a quiescent state to produce a supernatant ammonium phosphate solution and a bottoms products and recovering the phosphate solution.

2. The method as described in claim 1 in which said clay is introduced into said solution as the solution is introduced to storage.

References Cited

UNITED STATES PATENTS 3,276,998   10/1966   Green _____ 210—53 X

FOREIGN PATENTS 627,743   9/1961   Canada _____ 209—5
770,256   3/1957   Great Britain _____ 209—5

OTHER REFERENCES

George, Chemical Engineering, Dec. 14, 1959, vol. 66, #25, pp. 156, 157.

Olin, Journal of The Amer. Water Works Assoc., vol. 30, #3, March 1938, pp. 498–506.

Bentonite, American Colloid Co., 1940, Data #234—pp. 1-4, Ciro UN 26—1 page, Data #A-215—1 page.

WILBUR L. BASCOMB, Jr., Primary Examiner

S. J. EMERY, Assistant Examiner

U.S. Cl. X.R.

23—107, 300, 302, 312 P; 210—42; 209—5, 173